UNITED STATES PATENT OFFICE.

ROBERT M. THOMPSON, OF NEW YORK, N. Y.

PROCESS OF OBTAINING AND SEPARATING SULPHIDE OF NICKEL.

SPECIFICATION forming part of Letters Patent No. 489,574, dated January 10, 1893.

Application filed June 20, 1892. Serial No. 437,364. (No specimens.)

*To all whom it may concern:*

Be it known that I, ROBERT M. THOMPSON, a citizen of the United States, and a resident of the city, county, and State of New York, have invented certain new and useful Improvements in Processes of Obtaining and Separating Sulphide of Nickel, of which the following is a specification.

My invention relates to an improvement in the method or process of obtaining and separating commercially pure sulphide of nickel for use in metallurgical operations, in the treatment of mattes of copper, nickel, iron, and other metals, as the same result from the various operations of ore smelting, and more particularly to a method or process in which the separation is effected by the addition of certain chemical re-agents, which not alone change the chemical composition of the smelted mass, but also tend to produce after smelting great fluidity in the mass, whereby the various metals or salts of metal contained therein, assume upon cooling, by reason of their varying specific gravity, such relative positions with reference to each other, that they may be readily separated by mechanical means, or by hand.

In an application for Letters Patent of the United States heretofore filed by me in the United States Patent Office, as Serial No. 424,866, I have described a process for obtaining and separating sulphide of nickel. When as described in the aforesaid application, nickel is combined with other metals, as for instance iron and copper, or either of them, in an ordinary matte produced from or by the primary treatment of the ores of these metals, in the ordinary operation of smelting, and when the mattes or other substances containing nickel are treated with a certain class of alkalies or alkaline salts, rich in oxygen, such as carbonates of the various alkaline metals or ammonium or caustic alkalies, such as potash or soda or either of them or any of them mixed together, the combined molecule is split up, and the nickel is desulphurized and changed either into a crude metallic form, or into a sulphide differing from that in which it existed in the ore or matte, in chemical composition, and containing more or less sulphur, according to conditions, and the product of the smelting operation, so far as it consists of this crude nickel or nickel sulphide, will be of greater specific gravity than the other metals and may be readily separated therefrom. The changes aforesaid result from the varying affinity of the different metals for sulphur as explained in said application.

When any of the substances above mentioned are added to a charge of matte, in a cupola, or blast furnace, in suitable quantities the caustic alkali or carbonate, tends to absorb a portion of the sulphur from the matte, and to form a sulphide of the particular alkaline metal or ammonium which is employed. In so doing it breaks up the combined molecule in which the metals exist, and takes from part of the metals the greater part of the sulphur combined in them. As under these conditions the sulphur has a less affinity for the nickel than for the other metals, a proportionately larger amount of nickel, than of the other metals is reduced to a metallic state, and when the smelted mass is tapped after smelting, from the furnace, and allowed to cool, in an ordinary cooling bed, or in any mold or slag pot, two distinct compounds will be found to have been produced, which differ in specific gravity and will assume with reference to each other the relative position of layers or strata, and which are called "tops" and "bottom" according to their position. The "tops" so called consist of sulphide of the alkaline metal or ammonium, sulphide of copper and some sulphide of iron and nickel, while the "bottoms" consist of a small amount of alkali and copper, iron and nickel in crude metallic state and perhaps a little sulphide of these metals, the proportion of the nickel being largely in excess of the proportion of the iron and copper.

The separation of the "tops" from the "bottoms" is effected, as described in said application, while they are still liquid, by allowing the mass to settle, and then siphoning or pouring off the former in any convenient manner, for the reason that in practice the "bottoms" solidify rapidly while the "tops" remain liquid. If now the so-called "bottoms" resultant from the operation or step in the separation are subjected to further treatment by again smelting or melting in any shaft or other suitable furnace, with any sulphide of any alkaline metal or ammonium, as for instance sulphide of soda, containing preferably an excess of free sulphuric acid, or with niter cake or salt cake, as described in a certain other application for Letters Patent filed herewith in the United States Patent Office as a divisional application of said aforesaid application, the metals by re-absorbing sulphur from the sulphide of soda or other sulphide of any alkaline metal or ammonium, will be reconverted into sulphides, and the alkaline base converted into caustic alkali. The tendency of the sulphides thus formed is not to form a compound molecule such as existed in the original ore, or matte, but separate molecules of sulphides of the various metals present.

The copper and iron associated with the metallic nickel in the "bottoms" resultant from the first treatment with caustic alkalies or carbonates of alkaline metal or ammonium, exists either as a different sulphide from that in which it existed before, or in a lower sulphide, and when the sulphide of the alkaline metal or ammonium is added or niter cake or salt cake are added with an excess of carbon, first the copper, then the iron and finally the nickel, take up sulphur from it, and the lower sulphides existing in the "bottoms" with the crude nickel are converted into full sulphides. The action of these re-agents has been fully described in the aforesaid separate applications, and I refer hereby to them for a full description thereof as their action forms no part of the present invention.

The nickel sulphide settling in the "bottoms" may be separated by mechanical means or by hand and subjected to repeated treatment, by smelting with a sulphide of the alkaline metal or ammonium any number of times, the iron and copper may be still further separated, and eventually a sulphide of nickel will be produced, which is commercially pure.

The present invention relates to the utilizing of the by products of the operation of separating described in the aforesaid applications as re-agents or fluxes in subsequent operations of similar character for the purpose of effecting a cheaper and equally efficient separation.

The "tops" resultant from the second step of the separation above referred to in the aforesaid process or from the treatment of the "bottoms" from the first step with sulphide of the alkaline metal or ammonium either as such, or as produced by smelting with niter or salt cake, with an excess of carbon contain a large amount of caustic alkali. Now I have discovered that by substituting these "tops" for the caustic alkalies or carbonates of the alkaline metals or ammonium referred to as the re-agent used in the first step of the above described process, it is possible to effect the separation equally efficiently and much more cheaply, as an economical source of supply for the caustic alkali necessary to effect such first step, is thus at once provided. In order to procure "tops" suitable for use in this manner, it is sometimes necessary to eliminate a considerable proportion of the iron by the ordinary smelt-process, for the reason that although this is in nowise essential for the separation, nevertheless the resultant "tops" will, if the alkali is associated with an excess of iron not act as a proper re-agent. If desired, the "tops" containing the caustic alkali can be allowed to weather, i. e. to become exposed to the action of heat and rain, and thus the alkali will be dissolved out of the "tops" by the water, leaving behind the sulphides of copper, iron and nickel. By evaporating the alkali to such consistency as may be found convenient, and then charging it with the ore or mattes into the furnace, the "tops" may be used as before.

In case sufficient caustic alkali cannot be obtained from the "tops" above described, a portion of the mattes or ores to be treated in the first step of the initial process may be smelted directly with a sulphide of an alkaline metal or ammonium with the difference in result, that the metals in the bottoms will remain in the form of sulphides, and the "tops" so formed will then be found to contain sufficient caustic alkali, to enable them to be thereafter used, as a re-agent, in the first step of subsequent treatments of other nickeliferous bodies. In each case the object sought to be obtained is to effect the first step of the initial treatment of the mattes, as far as possible by smelting the ores and mattes with caustic alkali, supplied from "tops" resultant from the second step of the previous treatment.

The smelting operation may be carried out in any convenient form of furnace and the separation effected as above indicated either by siphoning off, after settling before cooling or by mechanical separation after the smelted mass has become hard. The sulphide of nickel thus separated may be subjected to further metallurgical treatment, and be reduced to metallic nickel and sold as such, or it may be converted into oxide of nickel and sold, or sold directly as sulphide, according to the purpose for which the nickel is required.

I claim as my invention:

1. The hereinbefore described method of producing crude nickel for use in the production of nickel sulphide consisting in smelting ores, mattes or other bodies containing nickel with the "tops" rich in caustic alkalies, produced from smelting crude nickel with alkaline sulphides or other re-agents producing sulphides of alkaline metals or ammonium in previous operations.

2. The hereinbefore described method of producing and separating crude nickel for use in the production of sulphide of nickel consisting in smelting the ores, or mattes containing nickel with a concentrated alkali, produced by allowing the "tops" resultant from the smelting of crude nickel with sulphides of alkaline metals or ammonium in previous operations to decompose by exposure to air, and then separating the insoluble portions, and allowing the nickel sulphide so formed to settle and separating the same after settling.

In testimony that I claim the foregoing as my invention I have signed my name, in presence of two witnesses, this 3d day of June, 1892.

ROBT. M. THOMPSON.

Witnesses:
C. VAN BRUNT,
J. W. CLARKE.